(12) United States Patent
Cloutier et al.

(10) Patent No.: US 7,731,924 B2
(45) Date of Patent: Jun. 8, 2010

(54) GROUP OF AT LEAST TWO GAS-FLOW REACTORS SUPPLIED WITH CHEMICAL NEUTRALIZATION AND/OR SORPTION AGENT

(75) Inventors: Bernard Cloutier, Granby (CA); Thierry Malard, L'isle-Adam (FR)

(73) Assignee: Solios Environnement, Saint-Germain-en-Laye (FR)

(*) Notice: Subject to any disclaimer, the term of this patent is extended or adjusted under 35 U.S.C. 154(b) by 0 days.

(21) Appl. No.: 12/279,543

(22) PCT Filed: Feb. 23, 2006

(86) PCT No.: PCT/FR2006/000415
§ 371 (c)(1),
(2), (4) Date: Aug. 15, 2008

(87) PCT Pub. No.: WO2007/009649
PCT Pub. Date: Aug. 20, 2007

(65) Prior Publication Data
US 2009/0068077 A1 Mar. 12, 2009

(51) Int. Cl.
*B01D 53/34* (2006.01)
*B01D 53/74* (2006.01)
*B01D 53/81* (2006.01)

(52) U.S. Cl. ............... 423/210; 423/240 R; 423/240 S; 423/245.1; 422/168; 422/169; 422/170; 422/171; 422/172; 422/177

(58) Field of Classification Search ................ 423/210, 423/240 R, 240 S, 245.1; 422/168–172, 422/177
See application file for complete search history.

(56) References Cited

U.S. PATENT DOCUMENTS

| | | | | |
|---|---|---|---|---|
| 2,231,309 | A | * | 2/1941 | Weber ......................... 423/490 |
| 2,522,426 | A | | 9/1950 | Black |
| 3,093,465 | A | | 6/1963 | Latta |
| 3,316,060 | A | * | 4/1967 | Dexter et al. ................. 423/484 |
| 4,061,476 | A | | 12/1977 | Hölter et al. |
| 4,501,599 | A | | 2/1985 | Loukos |
| 5,603,907 | A | | 2/1997 | Grochowski |
| 5,885,539 | A | | 3/1999 | Bjarnø et al. |

FOREIGN PATENT DOCUMENTS

| WO | 96/15846 A | 5/1996 |
|---|---|---|
| WO | 97/12659 A | 4/1997 |

* cited by examiner

*Primary Examiner*—Timothy C Vanoy
(74) *Attorney, Agent, or Firm*—Young & Thompson (57) ABSTRACT

A group of at least two gas-flow reactors ($2_1$, $2_2$, $2'_2$, ..., $2_n$, $2'n$) preferably with an ascending gas flow (3), are supplied in parallel with gas and with a chemical neutralization and/or sorption agent of the pulverulent material type capable of adsorbing effluents present in the gas flow by bringing the chemical neutralization and/or sorption agent in contact with the gas flow, the at least two reactors having elements (10) for collecting the chemical neutralization and/or sorption agent after contact with the gas flow. At least one of the two reactors has elements (11) for discharging the chemical neutralization and/or or sorption agent, after contact with the gas flow, these discharge elements being connected to the collecting elements, and members (7, 16) for injecting the chemical neutralization and/or sorption agent into at least one other of the at least two reactors.

14 Claims, 5 Drawing Sheets

GROUP OF AT LEAST TWO GAS-FLOW REACTORS SUPPLIED WITH CHEMICAL NEUTRALIZATION AND/OR SORPTION AGENT

The present invention relates to a group of at least two gas-flow reactors, preferably with an ascending gas flow, which are supplied with a chemical neutralization and/or sorption agent of the powdery material type that is capable of adsorbing and/or chemically neutralizing effluents present in the gas flow by bringing the chemical neutralization and/or sorption agent into contact with the gas flow.

It is economically and ecologically advantageous to separate the polluting effluents present in gas flows issuing from industrial installations before releasing these flows into the atmosphere. Moreover, these polluting effluents may be potentially valuable chemicals.

In order to purify gas flows, it is known to use vertical reactors for contacting chemical neutralization and/or sorption agents of the powdery material type, particularly agents for the chemical and/or physical neutralization of at least one effluent, that are capable of purifying gas flows in reactors, these reactors being supplied by devices for distributing chemical neutralization and/or sorption agents and comprising means for distributing at least one chemical neutralization and/or sorption agent in the corresponding gas flow, and also means for collecting and discharging the chemical neutralization and/or sorption agent laden with effluents after it has been brought into contact with the gas flow.

In the context of the present invention, "reactor" means any chamber in which a reaction takes place by bringing a chemical neutralization and/or sorption agent into contact with a gas flow. It may therefore be a fluidized bed reactor, of a type known per se, in which the gas to be treated flows directly through a fluidized bed of powdery materials. Alternatively, it may be a chamber consisting of filtering means and means for bringing the powdery material into contact with the gas to be treated.

The effect resulting from this contacting of the gas flows, preferably ascending gas flows, in these reactors with the particles of powdery materials has the object, in particular, of adsorbing and/or neutralizing the polluting gas compounds and combining the fines with these particles.

More precisely, the invention relates to the purification of at least one polluting effluent of a gas flow, preferably an ascending gas flow, more particularly a gas flow issuing from aluminum electrolytic cells or kilns for firing anodes for aluminum electrolysis, a reactor in which an agent for chemical and/or physical neutralization of the polluting effluents is introduced and distributed, for example fresh alumina, or coke powder, in order to neutralize, in particular, the fluorine-containing elements, or tars, pitches and other organic elements, such as polycyclic aromatic hydrocarbons, by adsorption or by chemical reaction.

The question more particularly arises of when it is necessary to separate the hydrofluoric acid (HF) from the offgases.

In fact, due to the use of complex fluorides such as cryolite as flux in the electrolysis of aluminum, the gases used have relatively high proportions of HF, which must therefore be recovered before release into the atmosphere.

This problem of recovering the fluorine-containing compounds has already been partially resolved in the prior art with more or less high efficiencies and costs.

Common separation techniques use methods for bringing the gases into contact with a chemical neutralization and/or sorption agent by the dry method, in particular using powdery materials which allow a rapid reaction between the chemical neutralization and/or sorption agent and the gases, obtaining better purification, lower operating temperatures and savings in energy.

In order to lower the costs of chemical neutralization and/or sorption agents of the alumina type, application FR 2 139 648 describes a method for adsorbing fluorine gas on alumina particles, the alumina particles being placed in suspension in a suction column traversed by the gas flow, the alumina particles leaving the suction column then being partly recycled to the suction column and partly sent to storage means before use in the electrolysis cells, optionally after mixing with fresh alumina. It is thus commonly known how to recycle alumina to a single reactor or to return it to the storage means before use in the electrolytic cells.

On the same principle, patent application FR 2 692 497 describes a device for treating a gas by bringing it into contact with solid particles, said device consisting of a reactor placed inside a bag filter, equipped with a hopper for collecting particles separated from the treated gas stream. The gases to be treated are conveyed into the reactor by a vertical line entering into the lower part of the reactor through the bottom of the hopper which is permeable to air, an air box placed under the bottom and supplied with compressed air maintaining the particles present in the bottom part of the hopper in a fluidized state.

The particles contained in the hopper in a fluidized state are recovered due to the existence of an adjustable-level overflow for adjusting the height of the fluidized bed. The particles discharged by the overflow are collected and partly recycled to the same reactor and partly sent to storage means before use in the electrolytic cells.

Thus, according to this prior art, in order to improve the yield, part of the alumina laden with fluorine-containing components is reinjected into the reactor.

Nevertheless, one of the problems with the prior art is the need to use large quantities of fresh alumina to obtain a high efficiency purification of the gas flows.

Thus, patent application FR 2 310 151 describes a treatment device and method for separating harmful products present in offgases by contact with a solid adsorbent.

Once the chemical neutralization and/or sorption agent has been brought into contact with the gas flow, said agent must be removed, while the reactor must be supplied regularly with fresh chemical neutralization and/or sorption agent.

However, after the chemical neutralization and/or sorption agent has been brought into contact with the gas, the agent for chemical neutralization and/or sorption of the gas is reintroduced into the gas stream at a point such that the sorption capacity of the agent is decreased to a level such as to make it possible to retreat the chemical neutralization and/or sorption agent, to remove it economically, or to reuse it in a downstream process.

The basic principle of this known method consists in that a fraction of the circulating chemical neutralization and/or sorption agent is withdrawn and in that a corresponding fraction of fresh chemical neutralization and/or sorption agent is injected into the circuit.

To do this, the gas flow to be purified flows in succession through a plurality of venturis after each of which a separator is mounted for the chemical neutralization and/or sorption agent that is introduced into the last venturi in which the gas flows, and then into the following venturis in the opposite direction to the gas flow, the withdrawal of the chemical neutralization and/or sorption agent taking place after the first venturi considered in the flow direction.

A countercurrent effect is thereby obtained, culminating in a high degree of purification and an economically advantageous process.

Patent EP 0 793 527 also describes a method for separating substances from a gas medium by two-stage dry adsorption, the gas flowing in succession through these two stages. More precisely, the method relates to the separation of a fluorine-containing gas from a gas emitted during the production of aluminum, the fluorine-containing substances being adsorbed on solid aluminum oxide by a dry adsorption process. The gas is treated in a first stage with partially spent aluminum oxide. The latter is then separated downstream from the first adsorption stage before being partly reinjected into the electrolytic cells and partly recirculated in the first adsorption stage. The previously partially purified gas then flows into a second adsorption stage where it is treated with reactive particulate aluminum oxide which is practically unused. At least part of the particulate aluminum oxide is then separated downstream of the second stage and is transferred to the first adsorption stage. Moreover, the same gas to be treated flows through two adsorption stages to obtain the desired purification.

Furthermore, the yields obtained with the prior art are not sufficiently high and the installations employed are relatively cumbersome to install.

In order to avoid treating powdery materials in themselves, it has also been proposed, in the particular case of the treatment of gas flows issuing from aluminum electrolytic cells and the use of alumina as a chemical neutralization and/or sorption agent, to create turbulences in the gas flow in order to improve the mixing and the contact time between the gas flow and the chemical neutralization and/or sorption agent. However, these turbulences favor the reduction of the size of the alumina particles by attrition, thereby causing a loss of quality of the powdery alumina, which is unfavorable to the aluminum production process by reinjection into the electrolytic cells of the alumina recovered after the purification treatment and laden with fluorine-containing compounds also required for the aluminum electrolysis.

Thus, this embodiment does not solve all the problems previously described, that is the production costs, the yields and the quantity of waste obtained.

Moreover, in the case of the simultaneous treatment of a plurality of reactors, differences in the effluent recovery yield between each reactor have been observed.

It would therefore be particularly advantageous to produce a gas flow treatment installation allowing lower quantities of adsorption agents to be used, the adsorption yields to be increased, the costs to be substantially decreased, and the gas flows to be treated in parallel and the same gas flow not to be treated by successive passage thereof through a plurality of reactors.

The present invention proposes to solve the problems associated with the prior art by means of an installation that is also called a gas treatment center, for obtaining a high purification of the gas flows while using reduced quantities of powdery materials, for improving the purification yield at constant quantity of alumina, and for obtaining a constant yield independently of the climatic conditions.

For this purpose, the invention relates to a group of at least two gas-flow reactors preferably with an ascending gas flow, which are supplied on the one hand, in parallel, with gas and on the other hand with a chemical neutralization and/or sorption agent of the powdery material type that is capable of adsorbing effluents present in the gas flow by bringing the chemical neutralization and/or sorption agent into contact with the gas flow, the at least two reactors having means for collecting the chemical neutralization and/or sorption agent after it has been brought into contact with the gas flow, characterized in that at least one of the two reactors has means for discharging the chemical neutralization and/or sorption agent, after having been brought into contact with the gas flow, the means being connected to the collecting means, and means for injecting the chemical neutralization and/or sorption agent into at least one other of the at least two reactors.

According to a first embodiment of the invention, at least one reactor is supplied exclusively with chemical neutralization and/or sorption agent issuing from means for storing a chemical neutralization and/or sorption agent and the other reactor or reactors of the group are not supplied with chemical neutralization and/or sorption agent issuing from the storage means, the at least one reactor supplied exclusively discharging, with the help of discharging means, chemical neutralization and/or sorption agent laden with effluents after being brought into contact with the gas flow, to at least one other reactor of the group. Preferably, said other reactors of the group are supplied in series with chemical neutralization and/or sorption agent laden with effluents issuing for each of them from the discharging means of the reactor immediately upstream in the series.

In order to permit the discharge of the chemical neutralization and/or sorption agent laden with effluents, the discharging means of the at least two reactors are connected to a discharge line common to the at least two reactors.

According to a second embodiment of the invention, at least one reactor is overfed with chemical neutralization and/or sorption agent issuing from means for storing a chemical neutralization and/or sorption agent, compared to the other reactors of the group and this overfed reactor discharges, with the help of discharging means, at least part of the powdery material laden with effluents after being brought into contact with the gas flow, to at least one other reactor of the group. Preferably, all the reactors of the group are supplied in parallel with chemical neutralization and/or sorption agent from the storage means and each of said other reactors of the group is supplied with chemical neutralization and/or sorption agent in a quantity which is part of the fraction of chemical neutralization and/or sorption agent supplying the overfed reactor with chemical neutralization and/or sorption agent.

To permit the transfer of the chemical neutralization and/or sorption agent between reactors which are sufficiently distant from one another, the discharging means consist of at least one air slide.

In general, the invention relates to a gas treatment center consisting of at least one group having one of the preceding features.

Furthermore, the invention also relates to a method for purifying a gas flow by bringing the flow into contact with a chemical neutralization and/or sorption agent of the powdery material type, using at least one group of at least two reactors supplied in parallel with gas flow, characterized in that it comprises the step of removing the chemical neutralization and/or sorption agent after it has been brought into contact with the gas flow in at least one of the reactors, into at least one other of the at least two reactors. More specifically and advantageously, the method according to the invention is used with alumina $Al_2O_3$ as the powdery material, which is brought into contact with a gas issuing from aluminum electrolytic cells.

The present invention will now be described with the help of examples that are only illustrative and do not limit the scope of the invention, and in conjunction with the appended illustrations in which.

Figure 1:
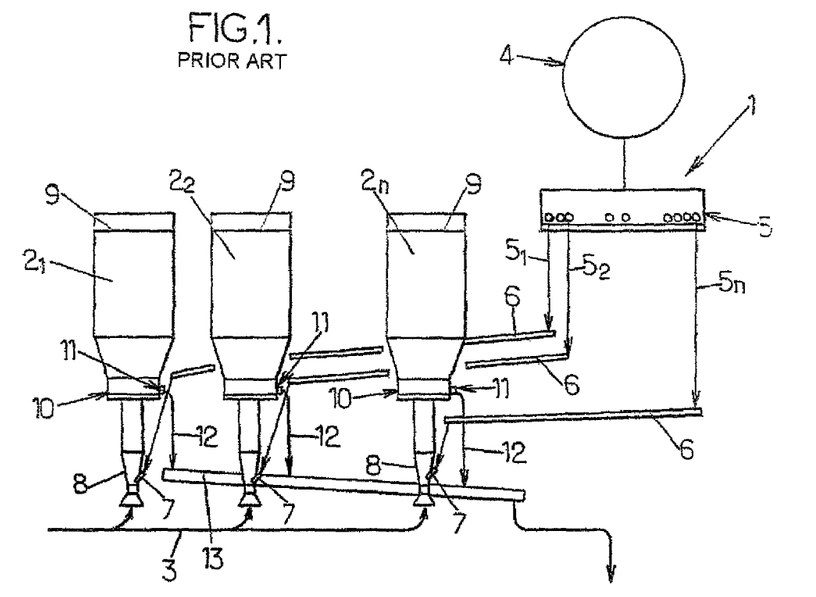
FIG. 1 is a schematic representation of a gas treatment center supplied with powdery material according to the prior art.

The present invention relates to a gas treatment center 1 consisting of a plurality of reactors ($2_1, 2_2, \ldots 2_n$) having the same treatment capacity and in which, in parallel, a gas stream 3 flows, preferably an ascending gas flow, to be purified of effluents, the reactors ($2_1, 2_2, \ldots, 2_n$) being supplied in parallel with chemical neutralization and/or sorption agent of the powdery material type, of a type known per se, issuing from means (4) for storing powdery materials, of the silo type, and distributed to the reactors ($2_1, 2_2, \ldots, 2_n$) by means of distribution means 5 provided between the storage means 4 and the reactors ($2_1, 2_2, \ldots, 2_n$).

For the sake of simplicity, FIG. 1 only shows three reactors ($2_1, 2_2, \ldots, 2_n$), with the understanding that the invention may apply to any gas treatment center comprising at least two reactors. The reactors ($2_1, 2_2, \ldots, 2_n$) are particularly intended for bringing powdery material into contact, by any means known in the prior art, with a gas flow to be purified of effluents and/or fines. Preferably, the reactors ($2_1, 2_2, \ldots, 2_n$) are all identical, that is they have the same flow treatment capacity. Nevertheless, a person skilled in the art may adapt the principle of the invention to any type of group of reactors, whether the reactors are all identical or not.

The principle of the invention applies more particularly to gas flows 3 issuing from aluminum electrolysis cells, the polluting effluents of the type of fluorine-containing agents, for example hydrofluoric acid, being neutralized by the powdery material, in this example alumina $Al_2O_3$, by adsorption or by chemical reaction.

In the gas treatment center according to FIG. 1, the means 5 for distributing powdery material are advantageously designed to uniformly supply each of the reactors ($2_1, 2_2, \ldots, 2_n$) constituting the gas treatment center 1. Thus, if the center 1 comprises n reactors and if the distribution means 5 can supply a total of X tonnes per hour of powdery material, then each of the reactors ($2_1, 2_2, \ldots, 2_n$) is supplied with a flow rate of X/n tonnes per hour.

In this way, since the reactors ($2_1, 2_2, \ldots, 2_n$) receive the same quantity of powdery material, the effluent adsorption rate of each reactor will be substantially equal, with the understanding that each reactor ($2_1, 2_2, \ldots, 2_n$) receives the same fraction of the same gas flow 3.

More precisely, a feed line 6 connects the distribution means 5 to injection means 7, of a type known per se, for injecting the powdery material into the reactor ($2_1, 2_2, \ldots, 2_n$). Advantageously, the feed line 6 is of a type known per se, for example an air slide, with the understanding that the transport of the chemical neutralization and/or sorption agent of the powdery material type between the distribution means 5 and the reactor ($2_1, 2_2, \ldots, 2_n$) is carried out by any means known in the prior art, for example by a method for conveying powdery materials in a hyperdense bed. These conveying methods and devices serving to fluidize the powdery materials are known in the prior art and are not the subject of the present invention.

It is in fact known in the prior art to transport powdery materials from one point to another using air lines operating on the principle of the formation of a fluidized bed of powdery materials by contact with a fluidization gas.

Advantageously, the injection means 7 are placed substantially at the inlet of a nozzle 3 of the reactor ($2_1, 2_2, \ldots 2_n$) into which the gas flow 3 enters.

Once fresh powdery material issuing from the storage means 4 is injected into the reactor ($2_1, 2_2, \ldots, 2_n$), said material is brought into contact with the gas flow 3 by any means known per se for producing an optimal contact between the gas flow 3 and the powdery material culminating in an optimal purification of the polluting elements present in the gas flow.

When the powdery material is brought into contact with the gas flows 3, preferably ascending gas flows, the powdery materials are entrained in the gas flow 3 by an advantageously ascending movement.

However, each reactor ($2_1, 2_2, \ldots, 2_n$) has filtering means 9, for example of the cloth filter or bag filter type, preventing the release into the atmosphere of grains of particles of powdery materials outside the reactor ($2_1, 2_2, \ldots, 2_n$).

After the chemical neutralization and/or sorption agent is brought into contact with the gas flow 3 and the flow 3 is filtered by the filtering means 9, collecting means 10 of any type known per se are provided in hoppers at the bottom of the filters 9, for collecting particles of powdery materials, and connected by means known per se to means 11 for discharging the chemical neutralization and/or sorption agent laden with effluents accumulated in the reactor ($2_1, 2_2, \ldots, 2_n$).

In fact, collecting hoppers are advantageously provided in the reactors ($2_1, 2_2, \ldots 2_n$), consisting of collecting means 10 in which the particles can be collected and maintained in a fluidized state. These collecting hoppers were previously described in relation to patent application FR 2 692 497 and are of a type known per se.

The discharging means 11 are of a type known per se and are, for example, in the form of one or more orifices connected to a discharging line 12 of the air slide type, each discharging line 12 discharging into a central line 13 into which all the chemical neutralization and/or sorption agents laden with effluents discharged by all the reactors ($2_1, 2_2, \ldots, 2_n$) are discharged.

Thus, in the case in which fresh alumina is supplied to each reactor ($2_1, 2_2, \ldots, 2_n$) of a gas flow 3 to be defluorinated, fluorinated alumina is obtained in the central line 13 and is then discharged, either into storage means (not shown in the figure but of a type known per se), or into the aluminum electrolysis cells to be recycled therein.

Figure 2:
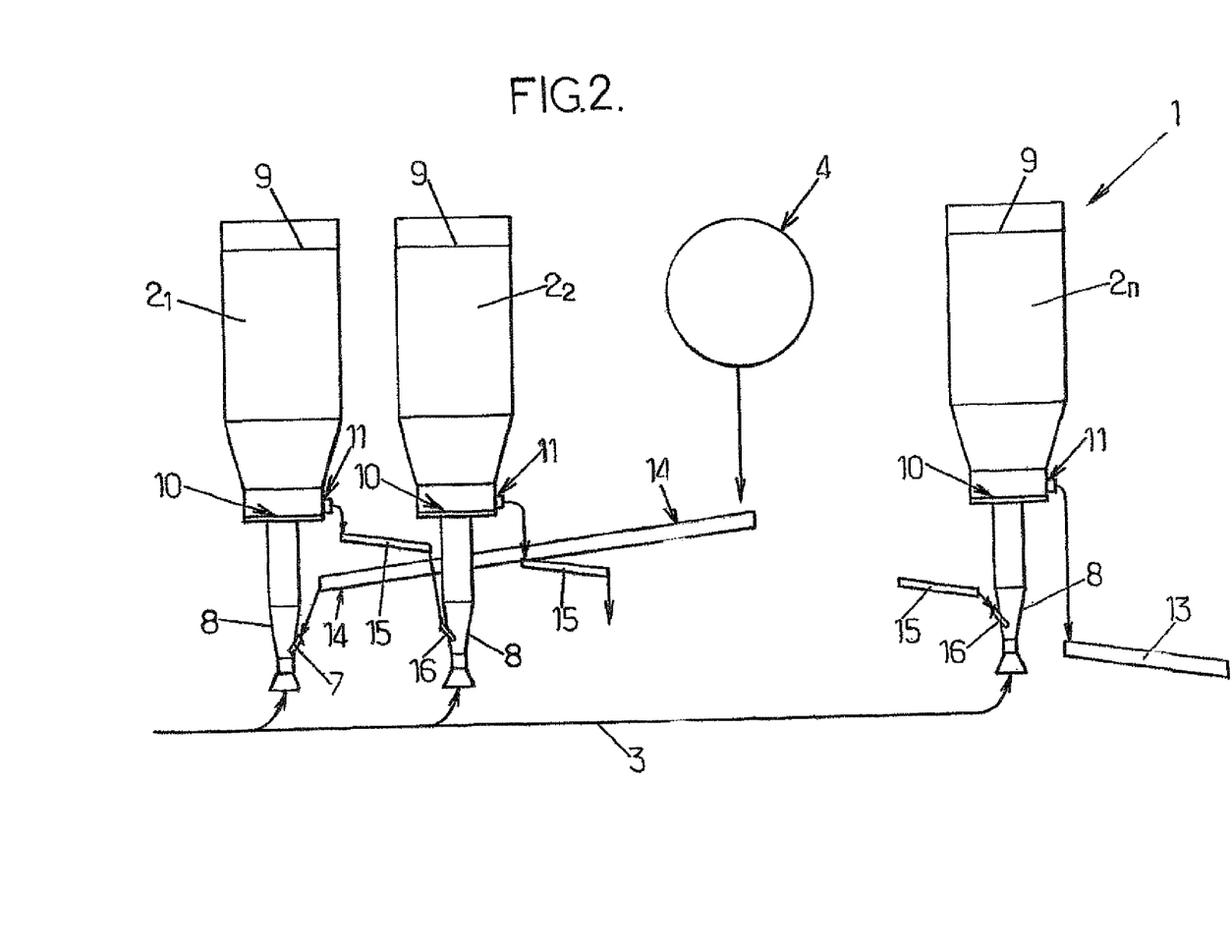
FIG. 2 is a schematic representation of a gas treatment center supplied with powdery material according to a first embodiment of the invention.

FIG. 2 shows a first embodiment of the device according to the invention, the identical elements having the same reference numerals throughout the description.

According to this embodiment, the storage means 4 discharge the chemical neutralization and/or sorption agent into a single feed air slide 14 of a type known per se, for example having a fluidized bed and discharging all of its content into a first reactor $2_1$.

According to this embodiment, the (n−1) other reactors ($2_2, \ldots, 2_n$) do not receive fresh chemical neutralization and/or sorption agent issuing from the storage means 4.

The first reactor $2_1$ then discharges all the chemical neutralization and/or sorption agent laden with effluents into a second reactor $2_2$ via the discharging means 11 connected to a discharging air slide 15 also advantageously of the fluidized bed type or of any type known per se for transporting powdery materials or chemical neutralization and/or sorption agents.

According to this embodiment, it is not necessary to provide means 5 for distributing the chemical neutralization and/or sorption agent for the n reactors because the chemical neutralization and/or sorption agent is exclusively supplied to the reactor at the beginning of the chain $2_1$, the chemical neutralization and/or sorption agent then being transported from one reactor to another up to the nth reactor, the chemical neutralization and/or sorption agent only passing once through each reactor $(2_1, 2_2, \ldots, 2_n)$ and passing in succession from one reactor to the other. The reactors $(2_1, 2_2, \ldots, 2_n)$ are thus supplied in series with chemical neutralization and/or sorption agents laden with effluents issuing for each of them from discharging means of the reactor $(2_1, 2_2, \ldots 2_n)$ immediately upstream in the series.

In this way, in the case of the purification of hydrofluoric acid contained in the offgases issuing from aluminum electrolysis cells, the quantity of fresh alumina resides for a certain period in the first reactor $2_1$ where it is enriched with fluorides and is then completely discharged into a second reactor $2_2$ where it resides for the same time and continues to be enriched with fluorides, and so on up to the nth reactor $2_n$, where it is discharged into the main line 13 of fluorinated alumina for its recycling into the electrolytic cells, for example, or into any other type of storage or recycling means.

An internal recycle of the chemical neutralization and/or sorption agent may be provided in each of the reactors $(2_1, \ldots, 2_n)$ due in particular to the presence of a hopper as previously described in patent FR 2 692 497, for example.

Furthermore, in the case of the shutdown of the mth reactor $2_m$, bypass means are provided, of a type known per se, for bypassing the powdery material laden with effluents directly from the (m−1)th reactor $2_{m-1}$ to the (m+1)th reactor $2_{m+1}$. Advantageously, these bypass means are also suitable for bypassing a plurality of reactors out of operation one after the other in the cascade of n reactors. In these cases of shutdowns of one or more reactors $(2_1, \ldots, 2_n)$, means are also provided for interrupting the entry of gas flow 3 into these reactors $(2_1, \ldots, 2_n)$.

The discharging air slide 15 discharges its contents into injection means 16 of the same type as the means 7 for injecting fresh chemical neutralization and/or sorption agent as previously described.

Furthermore, to take account of variations in the properties of the chemical neutralization and/or sorption agent, anti-abrasion means of a type known per se may be provided for the first reactors receiving this agent.

Thus, only the nth reactor $2_n$ is connected to a main line 13 where the chemical neutralization and/or sorption agent, laden with effluents after its passage through the n reactors, is discharged.

Figure 3:
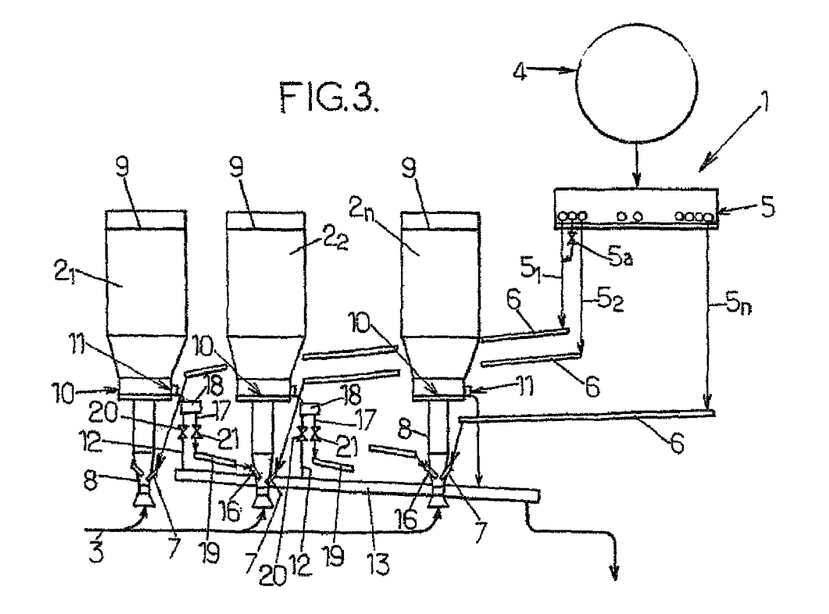
FIG. 3 is a schematic representation of a gas treatment center supplied with powdery material according to a second embodiment of the invention.

FIG. 3 is a schematic view of a second embodiment of a gas treatment center according to the invention.

According to the second embodiment of the invention, at the gas treatment center 1 as described in FIG. 1, a second discharge line 17 is added at the outlet of the means 11 for discharging the chemical neutralization and/or sorption agent laden with effluents.

More precisely, the discharging means 11 are connected to a divider 18, of a type known per se, connected to the first discharge line 12, said discharge line discharging the chemical neutralization and/or sorption agent flowing therein directly into the main line 13, as previously described, and also connected to a second line 17, which discharges the chemical neutralization and/or sorption agent flowing therein directly into the conveying means 19, of the secondary air slide type, discharging its contents into another reactor $(2_2, \ldots, 2_n)$ of the gas treatment center 1.

The first 12 and second 17 discharge lines respectively comprise a valve (20, 21) for opening the first line 12 and closing the second line 17 (in this case, the reactors operate according to the known embodiment described in FIG. 1) or for closing the first line 12 and opening the second line 17 (in this case, the reactors operate according to the second embodiment of the invention).

Thus, if there are n reactors, the basic principle of the second embodiment of the invention is that one reactor $2_1$ is supplied exclusively with fresh chemical neutralization and/or sorption agent and that it then discharges the chemical neutralization and/or sorption agent that it has received and which has been laden with effluents therein toward injection means 16 of a second reactor $2_2$ which, in turn, discharges the agent after contact with the gas in the second reactor $2_2$ to a third reactor after purification, and so on up to the nth reactor $2_n$, where the chemical neutralization and/or sorption agent used, filtered and collected is discharged by the discharging means 11 of the nth reactor $2_n$ into the central line 13. Unlike the first embodiment of the invention, the other (n−1) reactors $(2_2, \ldots, 2_n)$ may receive chemical neutralization and/or sorption agent issuing from the storage means 4.

The second discharge line 17 therefore serves to transport the powdery material from one reactor to another $(2_1, \ldots, 2_n)$ so that in this way, the powdery material can successively purify the gas flows 3 of several reactors $(2_2, \ldots, 2_n)$.

More precisely, the second reactor $2_2$ receives fresh alumina issuing from the storage means 4 and alumina laden with effluents in the first reactor $2_1$. The third reactor receives fresh alumina issuing from the storage means 4 and alumina laden with effluents in the first reactor $2_1$ and laden with effluents in the second reactor $2_2$. Thus, the third reactor receives fresh alumina and alumina laden with effluents after passing through the first and second reactors $(2_1, 2_2)$. And so on up to the nth reactor, which receives a fraction of alumina after its passage through 1, 2 up to n−1 reactors in addition to the fresh alumina issuing from the storage means 4.

Each secondary air slide 19 discharges its contents into a reactor $(2_2, \ldots, 2_n)$ via the means 16 for injecting chemical neutralization and/or sorption agents, laden with effluents, these injection means 16 being disposed on the nozzle 8 close to the device 7 for injecting fresh chemical neutralization and/or sorption agents issuing from the storage means 4.

According to an alternative embodiment, the injection means 16 and the injection device 7 are joined together, thereby allowing the mixing of the fresh chemical neutralization and/or sorption agent with the chemical neutralization and/or sorption agent laden with effluents before injection into the reactor $(2_2, \ldots, 2_n)$.

Thus, the means 16 for injecting chemical neutralization and/or sorption agents laden with effluents are substantially placed at the inlet of the gas flow into the reactor $(2_2, \ldots, 2_n)$.

Furthermore, the first reactor $2_1$, receives a higher quantity of chemical neutralization and/or sorption agent compared to the (n−1) other reactors thanks to the presence of a valve $5a$ at the outlet of the distribution means 5 that is capable of being opened or closed and discharging this surplus chemical neutralization and/or sorption agent into the supply line 6 connected to the first reactor $2_1$.

Considering n identical reactors and a total fresh alumina feed of X tonnes per hour for the gas treatment center, each reactor receives X/n tonnes per hour of fresh alumina in the case in which the valve 20 of the first line 12 is open and in which the valve 21 of the second line 17 is closed, as well as the valve 5a. This operating mode is identical to the operating mode described in FIG. 1.

According to an exemplary embodiment of the invention, and in order to preserve the flow rates, in the case in which the valve 20 of the first line 12 is closed and in which the valve 21 of the second line 17 is open, the overfeed of the first reactor $2_1$ by the open valve 5a corresponds to a flow rate of [X/n][(n−1)/(n+1)] tonnes per hour. Thus, the flow rate in the first feed line 6 connected to the first reactor $2_1$ is [X/n+[X/n][(n−1)/(n+1)]] tonnes per hour. Then, each of the other reactors $(2_2, \ldots, 2_n)$ of the group is supplied with chemical neutralization and/or sorption agent in a quantity which is part of the fraction of chemical neutralization and/or sorption agent supplying the overfed reactor with chemical neutralization and/or sorption agent. Preferably, each of the other reactors $(2_2, \ldots, 2_n)$ of the group is supplied with chemical neutralization and/or sorption agent in a quantity which is half of the fraction of chemical neutralization and/or sorption agent supplying the overfed reactor with chemical neutralization and/or sorption agent. Thus, in this preferable case, each of the other reactors receives a flow rate of [X/n+[X/n][(n−1)/(n+1)]]/2 tonnes per hour.

In general, if $B_i$ denotes the flow rate of fresh alumina (in tonnes per hour) supplied by the distribution means 5 to the reactor i (where i is an integer between 1 and n) and $\overline{M}$ the average equi-distributed flow rate in tonnes per hour, the flow rate of fresh alumina per reactor can be written with the following formulas:

According to the prior art as described in FIG. 1:

$$B_i = \frac{X}{n} = \overline{M} \text{(for any } i\text{)}$$

According to the operating mode of the present invention as described in FIGS. 2 and 3:

$$B_1 = f_1 \cdot \overline{M} \text{ with } 1 \leq f_1 \leq n$$

$$B_i = f_i \cdot \overline{M} \text{ with } 0 \leq f_1 \leq 1 \text{ for } 2 \leq i \leq n$$

$$\text{With } \sum_{i=1}^{i=n} f_i = n \text{ and with } f_i \text{ real positive or zero}$$

In the cascade embodiment as described in FIG. 2 with an exclusive supply in the first reactor $2_1$, we accordingly have $f_1=n$ and $f_i=0$ for $2\leq i\leq n$.

According to an alternative embodiment, it is possible for the valves (20, 21) to be partially open for a "mixed" operating mode of the gas treatment center 1, that is, part of the chemical neutralization and/or sorption agent laden with effluents is sent to another reactor $(2_2, \ldots 2_n)$, while another part is sent to the main line 13, in particular if the treatment capacities of the reactors $2_1$ to $2_n$ are different.

Furthermore, due to the presence of the valves (20, 21), it is possible to operate the gas treatment center 1 even if one reactor $(2_1, 2_2, \ldots, 2_n)$ is out of service. It suffices in this case to close the valves (20, 21) of the reactor out of service, for example the mth. It is also necessary to close the valve 21 of the (m−1)th reactor and to shut off the fresh alumina supply $5_m$ of the filter m.

According to a first preferable embodiment, the gas treatment center 1 operates according to the prior art, the reactor or reactors out of service being disconnected from the other reactors and no gas flowing through them. To do this, means for interrupting the gas flow are advantageously provided and are of a type known per se. The gas treatment center 1 then operates according to the principle as described in FIG. 1. All the valves 21 of all the reactors $(2_1, \ldots, 2_n)$ are then closed and all the valves 20 are open for all the reactors $(2_1, \ldots, 2_n)$ except the reactor $2_m$. The supply 5a is shut off to prevent overfeeding and thereby obtain an equi-distribution of the flow rates, the supplies $5_1$ to $5_n$ then discharge the same quantity of fresh alumina into the feed lines 6 except for the mth supply $5_m$ which is closed.

Alternatively, lines are provided for bypassing the powdery material, of a type known per se, in order to avoid the reactor or reactors out of service. The gas treatment center 1 then operates according to the cascade principle of the invention, the chemical neutralization and/or sorption agent not flowing in the reactor or reactors out of service, but flowing in the other reactors.

Alternatively, bypass means are provided for obtaining a cascade for recycling the chemical neutralization and/or sorption agent of (n-m) reactors, the other reactors not being part of the cascade forming a second cascade for recycling the chemical neutralization and/or sorption agent. Thus, if a reactor is out of service, two sub-cascades are formed operating according to the principle of the invention. Similarly, if two reactors are out of service, two or three sub-cascades are formed (this depends on whether the two reactors out of service are disposed side by side in the cascade), and so on according to the number of reactors out of service.

Figure 4:
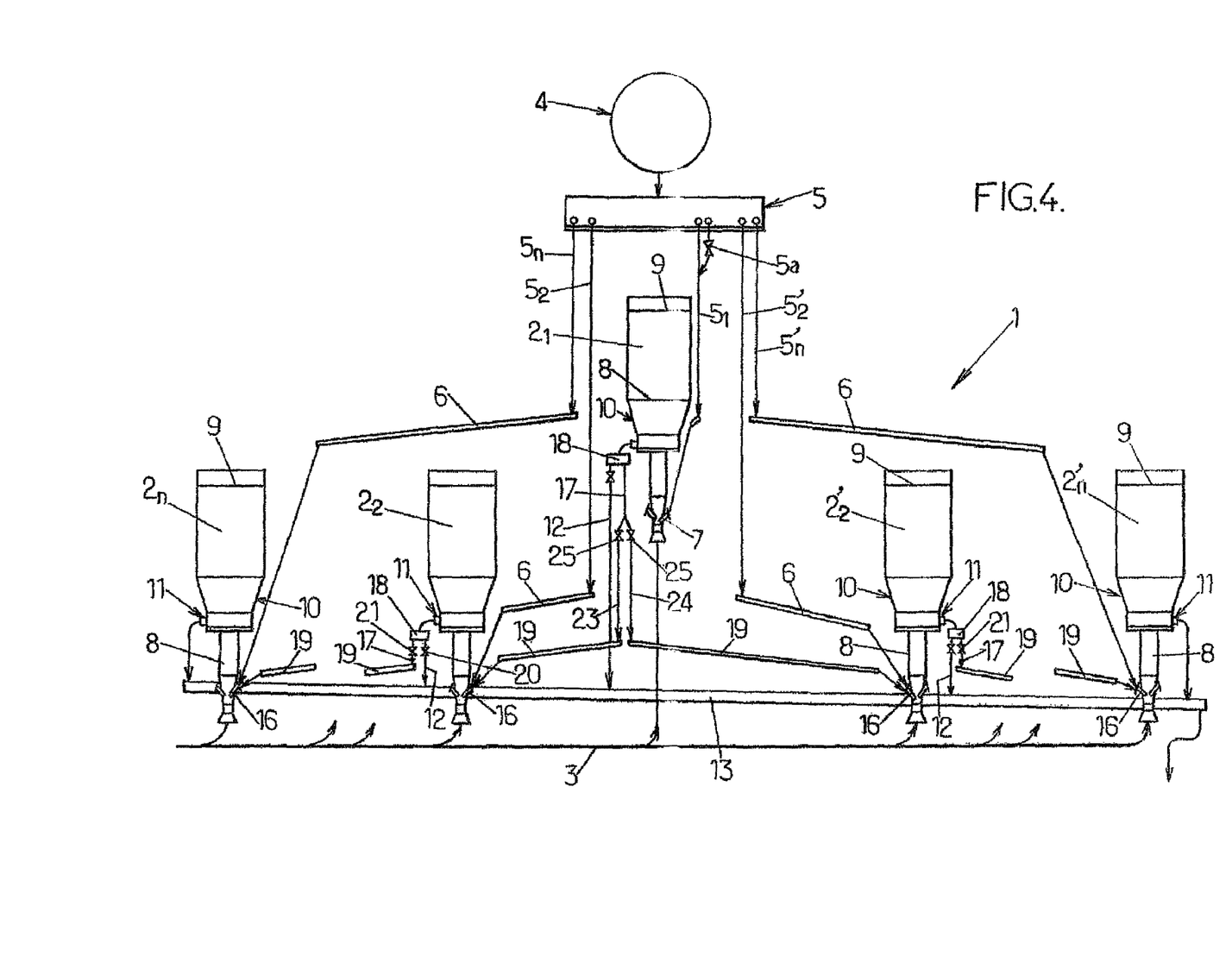
FIG. 4 is a schematic representation of a gas treatment center supplied with powdery material according to a third embodiment of the invention.

FIG. 4 shows a third embodiment of the gas treatment center 1 according to the invention.

This embodiment repeats the principle of the embodiment as described in FIG. 3, except for the fact that the first reactor $2_1$ overfed with fresh chemical neutralization and/or sorption agent discharges the chemical neutralization and/or sorption agent laden with effluents into the second line 17 which, in turn, is divided into two lines (23, 24) each connected to a secondary air slide 19.

Thus, the first reactor $2_1$ supplies recycled materials to two series of reactors $((2_2, \ldots, 2_n)$ and $(2'_2, \ldots, 2'_n))$ via the second line 17.

Each line (23, 24) issuing from the division of the second line 17 has a valve 25 for preferably opening or closing the recycled material supply of one of the two series of reactors $((2_2, \ldots, 2_n)$ and $(2'_2, \ldots 2'_n))$.

Figure 5:
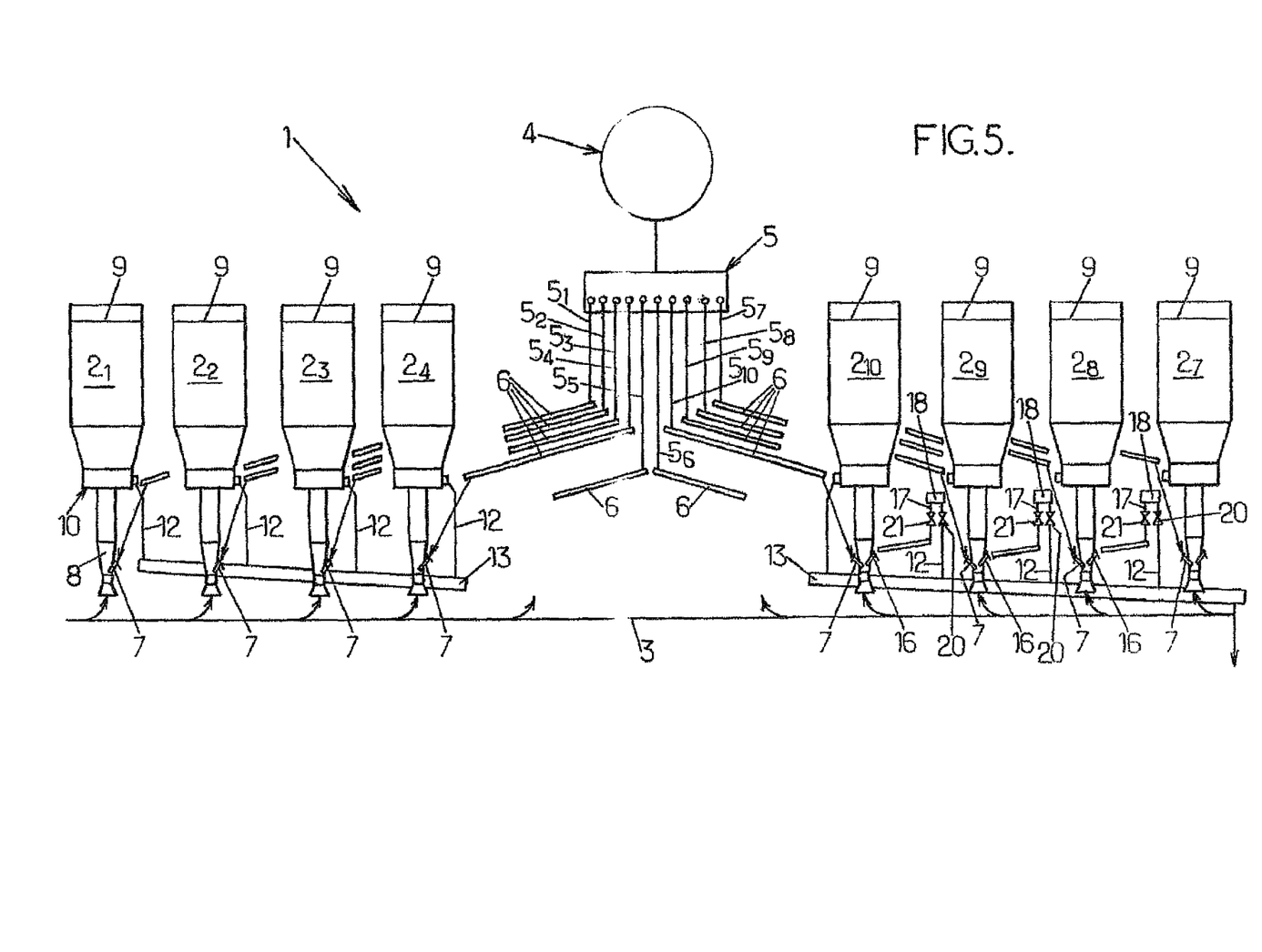
FIG. 5 is a schematic representation of a gas treatment center operating partly according to the prior art and partly according to the second embodiment of the invention.
Figure 6:
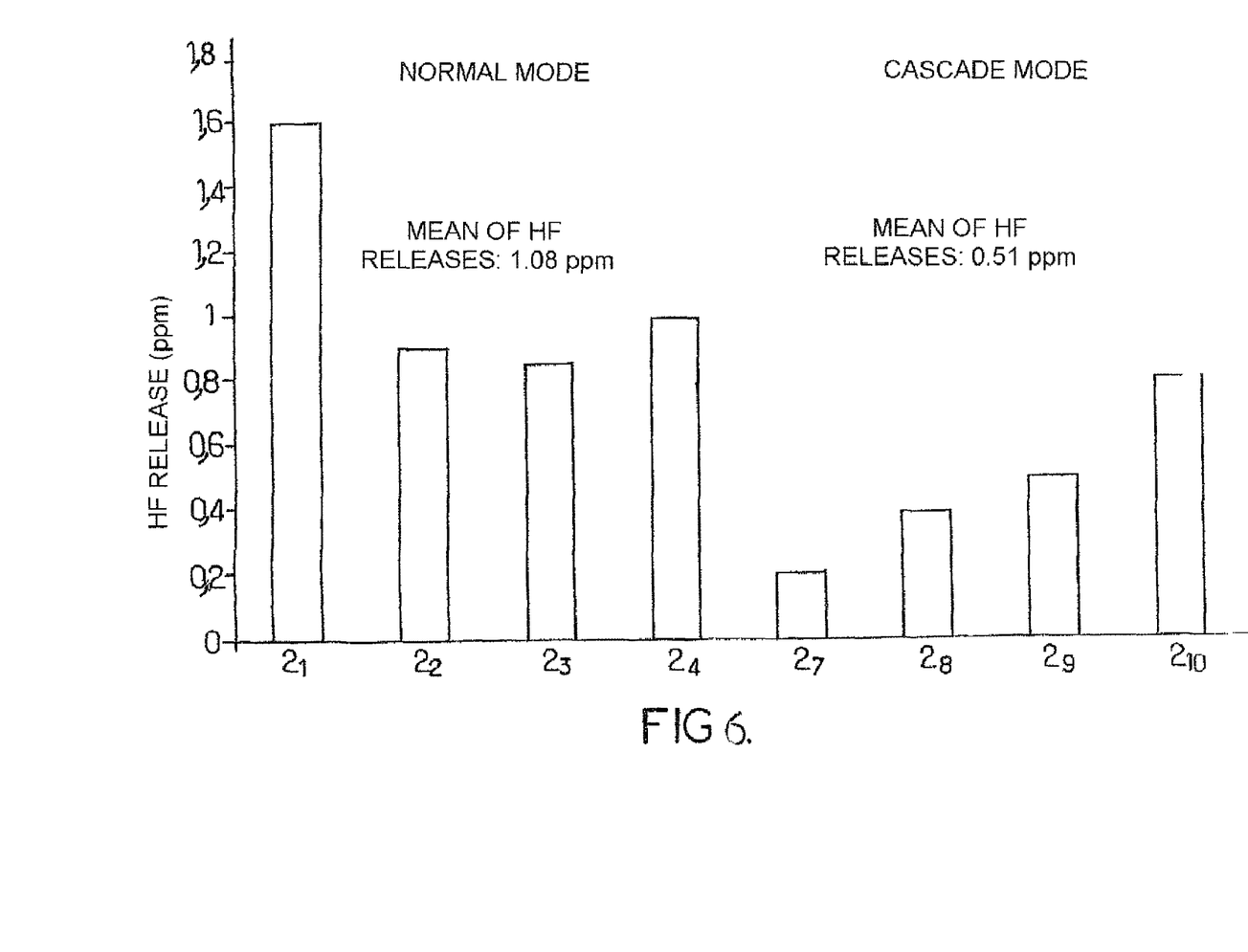
FIG. 6 is a histogram representing the quantities of HF released after passage of the gas flow through the gas treatment center of FIG. 5.

FIG. 5 is a schematic representation of a gas treatment center operating partly according to the prior art and partly according to the second embodiment of the invention, FIG. 6 illustrating the HF releases obtained after passage through the various parts of the center.

The HF releases obtained from a gas treatment site comprising 10 reactors $(2_1, 2_2, 2_3, 2_4, 2_5, 2_6, 2_7, 2_8, 2_9, 2_{10})$ are thus compared. To permit this comparison, four reactors $(2_1, 2_2, 2_3, 2_4)$ have been supplied according to the prior art as described in FIG. 1, that is with an equal quantity of fresh alumina. Thus, if X denotes a total quantity of fresh alumina supplied to all the reactors of the gas treatment center, then the first four reactors have been supplied with a quantity of X/10.

Four other reactors $(2_7, 2_8, 2_9, 2_{10})$ have been supplied according to the operating mode described in FIG. 3 in order to form a cascade of four reactors $(2_7, 2_8, 2_9, 2_{10})$. More precisely, and by way of example, the first reactor $2_7$ of the series has been overfed with fresh alumina compared to the other reactors $(2_8, 2_9, 2_{10})$ of the cascade. Advantageously, the first reactor $2_7$ of the series receives 70% of 4×/10 of fresh alumina, the second reactor $2_8$ of the series receives all the alumina laden with effluents from the first reactor $2_7$ of the cascade and in addition receives 20% of 4×/10 of fresh alumina. The third reactor $2_9$ of the series only receives 10% of 4×/10 of fresh alumina from the distribution means 5 but also all the alumina laden with effluents issuing from the reactor $2_8$ and the fourth and final reactor of $2_{10}$ of the series receives no fresh alumina from the distribution means 5 but receives all the alumina laden with effluents issuing from the reactor $2_9$.

According to the embodiment as described in FIG. 5, and for the embodiments described in FIGS. 3 and 4, each of the reactors ($2_1, \ldots, 2_n$) is provided with an internal recycle of chemical neutralization and/or sorption agent due in particular to the presence of a hopper as previously described in patent FR 2 692 497, for example.

The HF releases were then measured for these eight reactors. It was found that the mean of the releases for the four reactors ($2_1, 2_2, 2_3, 2_4$) operating according to the prior art was 1.08 ppm and that the mean of the HF releases for the four reactors ($2_7, 2_8, 2_9, 2_{10}$) operating according to the cascade mode was 0.51 ppm, the first reactor $2_7$ of the cascade releasing less HF compared to the fourth reactor $2_{10}$ of the cascade.

It was thereby proved that the total HF releases are decreased with an operation of the reactors according to the operating mode of the invention.

It was therefore discovered that the recycling of the chemical neutralization and/or sorption agent from one reactor to another serves to obtain better gas flow purification yields than the devices of the prior art.

Alternatively, it is also conceivable to provide a group of n reactors with two reactors or more supplied exclusively with fresh alumina, the other reactors operating according to the operating mode described in FIG. 2.

Similarly, it is also provided to overfeed two or more reactors compared to the other reactors of the gas treatment center, the other reactors then operating according to the operating mode as described in FIG. 3.

In the case of the figure where the reactors $2_1$ and $2_n$ are overfed with fresh alumina compared to the other reactors, the flow rate of fresh alumina per reactor can be written with the following formulas:

$$B_1 = B_n = f_1 \cdot \overline{M} \text{ with } 1 \leq f_1 \leq \frac{n}{2}$$

$$B_i = f_i \cdot \overline{M} \text{ with } 0 \leq f_i \leq 1 \text{ for } 2 \leq i \leq n-1$$

$$\text{With } \sum_{i=1}^{i=n} f_i = n \text{ and with } f_i \text{ real positive or zero}$$

In conclusion, the various embodiments of the invention serve to obtain an offgas purification yield at least as good as the devices of the prior art, while offering the possibility of decreasing the quantity of chemical neutralization and/or sorption agent to be used for obtaining these yields.

Moreover, the principle of the present invention also applies to gas treatment centers with reactors having different treatment capacities.

The invention claimed is:

1. A group of at least two gas-flow reactors, which are supplied with a gas-flow to be purified and with an agent having at least one of a chemical neutralization and sorption action and of the powdery material type that is capable of adsorbing effluents present in said gas flow by bringing said powdery agent into contact with said gas flow, each of said reactors comprising:
    a) injection means for injecting said powdery agent into the respective reactor;
    b) collecting means for collecting said powdery agent after said powdery agent has been brought into contact with said gas flow and is laden with effluents in the respective reactor; and
    c) discharging means for discharging said laden powdery agent collected, after having been brought into contact with said gas flow in the respective reactor, said discharging means being connected to said collecting means of the respective reactor,
    wherein said reactors are supplied in parallel with said gas-flow, and said discharging means of each said reactor are connected to said injection means of at least one other said reactor, so that said laden powdery agent collected after having been brought into contact with said gas-flow into said reactor is again brought into contact with said gas flow and laden with effluents into said at least one other reactor, except for at least one reactor said discharging means of which feeds a main discharging line with said laden powdery agent having been brought into contact with said gas-flow into said at least one reactor.

2. The group of reactors as claimed in claim 1, wherein at least one reactor is overfed with said powdery agent issuing from storage means for storing fresh powdery agent, compared to the other reactors of said group.

3. The group of reactors as claimed in claim 2, wherein said at least one reactor overfed with said fresh powdery agent discharges, with the help of said discharging means of said overfed reactor, at least part of said powdery agent laden with effluents after being brought into contact with said gas flow into said overfed reactor, to at least one other reactor of said group.

4. The group of reactors as claimed in claim 3, wherein all said reactors of said group are supplied in parallel with said fresh powdery agent from said storage means and each of said other reactors of said group is supplied with said fresh powdery agent in a quantity which is part of a fraction of said fresh powdery agent supplying said overfed reactor.

5. The group of reactors as claimed in claim 2, wherein all said reactors of said group are supplied in parallel with said fresh powdery agent from said storage means and each of said other reactors of said group is supplied with said fresh powdery agent in a quantity which is part of a fraction of said fresh powdery agent supplying said overfed reactor.

6. The group of reactors as claimed in claim 1, wherein at least one reactor is supplied exclusively with said powdery agent issuing from storage means for storing fresh powdery agent and the other reactor or reactors of said group are not supplied with said fresh powdery agent issuing from said storage means.

7. The group of reactors as claimed in claim 6, wherein said at least one reactor supplied exclusively with said fresh powdery agent discharges, with the help of said discharging means, said powdery agent laden with effluents after being brought into contact with said gas flow, into said at least one reactor to at least one other reactor of said group.

8. The group of reactors as claimed in claim 7, wherein said other reactors of said group are supplied in series with said powdery agent laden with effluents issuing, for each of said other reactors, from said discharging means of a reactor immediately upstream in the series.

9. The group of reactors as claimed in claim 6, wherein said other reactors of said group are supplied in series with said powdery agent laden with effluents issuing, for each of said other reactors, from said discharging means of a reactor immediately upstream in the series.

10. The group of reactors as claimed in claim 1, wherein said discharging means of at least one reactor are connected to said injection means of at least one other reactor by conveying means comprising at least one air slide.

11. The group of reactors as claimed in claim 1, wherein said discharging means of said at least two reactors are connected to a main discharge line common to said at least two reactors.

12. A gas treatment center consisting of at least one group of at least two gas-flow reactors which are supplied with a gas-flow to be purified and with an agent having at least one of a chemical neutralization and sorption action and of the powdery material type that is capable of adsorbing effluents present in said gas flow by bringing said powdery agent into contact with said gas flow, each of said reactors comprising:
   a) injection means for injecting said powdery agent into the respective reactor;
   b) collecting means for collecting said powdery agent after said powdery agent has been brought into contact with said gas flow, and is laden with effluents in the respective reactor, and
   c) discharging means for discharging said laden powdery agent collected, after having been brought into contact with said gas flow in the respective reactor, said discharging means being connected to said collecting means of the respective reactor,
   wherein said reactors are supplied in parallel with said gas-flow, and said discharging means of each reactor are connected to said injection means of at least one other reactor, so that said laden powdery agent collected after having been brought into contact with said gas-flow into said each reactor is again brought into contact with said gas flow and laden with effluents into said at least one other reactor, except for at least one reactor said discharging means of which feed a main discharging line with said laden powdery agent having been brought into contact with said gas-flow into said at least one reactor.

13. A method for purifying a gas flow by bringing said gas flow into contact with an agent having at least one of a chemical neutralization and sorption action of the powdery material type, using at least one group of at least two reactors supplied in parallel with said gas flow, the method comprising:
   discharging said powdery agent after said powdery agent has been brought into contact with said gas flow in at least one of said reactors; and
   injecting at least a part of said discharged powdery agent into at least one other of said at least two reactors, into which said discharged powdery agent is again brought into contact with said gas flow.

14. The method as claimed in claim 13, wherein the method is used with alumina $Al_2O_3$ as the powdery agent, which is brought into contact with a gas flow issuing from aluminum electrolytic cells.

* * * * *